United States Patent
Rusche

(10) Patent No.: US 6,716,384 B2
(45) Date of Patent: *Apr. 6, 2004

(54) PROCESS FOR THE ROTATIONAL MOLDING OF POLYURETHANE ARTICLES

(75) Inventor: Timothy Rusche, Loveland, OH (US)

(73) Assignee: Teresa Banks, Hamilton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/274,758

(22) Filed: Mar. 23, 1999

(65) Prior Publication Data

US 2001/0041233 A1 Nov. 15, 2001

(51) Int. Cl.$^7$ .............................................. B29C 41/04
(52) U.S. Cl. .................. 264/311; 264/45.7; 264/DIG. 6
(58) Field of Search ............................. 264/45.7, 311, 264/DIG. 6, 45.3

(56) References Cited

U.S. PATENT DOCUMENTS

| | | | |
|---|---|---|---|
| 3,875,275 A | * 4/1975 | Lemelson .................. 264/45.7 |
| 4,132,840 A | 1/1979 | Hugl et al. |
| 4,146,565 A | * 3/1979 | Quraishi .................... 264/310 |
| 4,183,883 A | * 1/1980 | Blair .......................... 264/310 |
| 4,230,876 A | 10/1980 | Scholl et al. |
| 4,236,016 A | 11/1980 | Scholl et al. |
| 4,339,592 A | 7/1982 | Becker et al. |
| 4,624,818 A | * 11/1986 | Black et al. ................ 264/255 |
| 4,775,558 A | 10/1988 | Haas et al. |
| 4,784,814 A | * 11/1988 | Diethelm et al. ...... 264/328.18 |
| 4,956,133 A | * 9/1990 | Payne ....................... 264/45.7 |
| 4,970,045 A | 11/1990 | Steinberg et al. |
| 5,053,274 A | 10/1991 | Jonas |
| 5,158,727 A | * 10/1992 | Coleman-Kammula et al. . 264/109 |
| 5,223,193 A | * 6/1993 | Bianchin et al. ........... 264/45.7 |
| 5,468,432 A | 11/1995 | Hurley et al. |
| 5,538,786 A | 7/1996 | Hurley et al. |
| 5,582,670 A | * 12/1996 | Andersen et al. ........... 264/108 |
| 5,693,696 A | * 12/1997 | Garrett et al. .............. 524/261 |
| 5,783,611 A | 7/1998 | Strebel |
| 5,803,004 A | * 9/1998 | Swann et al. ................. 114/56 |
| 5,830,392 A | 11/1998 | Strebel |
| 5,864,978 A | * 2/1999 | McRary et al. ........ 264/DIG. 6 |
| 5,869,546 A | 2/1999 | Gruss et al. |
| 5,872,182 A | 2/1999 | Duan et al. |

OTHER PUBLICATIONS

J.L. Throne & J. Gianchandani, *Reactive Rotational Molding*, Polymer Engineer and Science, Mid–Sep., 1980.

R.C. Progelhof & James L. Throne, *Parametric Concepts in Liquid Rotational Molding*, Polymer Engineering and Science, Oct., 1976.

J. L. Throne, J. Gianchandani & R.C. Progelhof, *Free Surface Reactive Fluid Flow Phenomena Within a Rotating Horizontal Cylinder*, 1981.

* cited by examiner

*Primary Examiner*—Allan R. Kuhns
(74) *Attorney, Agent, or Firm*—Wood, Herron & Evans, L.L.P.

(57) ABSTRACT

The present invention pertains to a process for the rotational molding of polyurethane composite articles. The process is carried out by placing a polyurethane composite precursor composed of a hardener, a resin and a filler, wherein the hardener comprises one or more organic di- or polyisocyanates, and the resin comprises of one or more compounds containing at least two isocyanate-reactive groups, the filler is about 15% to about 50% by weight, or alternatively, about 15% to about 35% by weight, or, in a preferred embodiment, about 25% by weight, the % weight being based upon total weight of the mixture, and either the hardener or the filler optionally contains additives and/or catalysts in a rotational mold, and rotating said mold until at least the first cure time of the molded article is completed. The invention a also pertains to the articles produced by use of this method.

13 Claims, No Drawings

PROCESS FOR THE ROTATIONAL MOLDING OF POLYURETHANE ARTICLES

TECHNICAL FIELD

The present invention relates to a process for rotationally-molding articles of polyurethane composite and to the molded polyurethane composite articles which result. The polyurethane molding process of this invention provides an efficient, cost-effective means to produce hollow, molded articles of polyurethane composite.

BACKGROUND

Molded articles made of polyurethanes are well known in the art. Typical uses for molded polyurethanes include both solid and hollow articles such as bumpers, machine mounts, metal forming pads, scraper blades, seals, chute and hopper linings, cutting surfaces, wipers and gaskets. Currently most, if not all, commercially available polyurethane articles are formed using injection molding processes. Specifically, molded polyurethane articles are formed by a process known in the art as reaction injection molding ("RIM") wherein molten, unpolymerized material is injected under high pressure and at high temperatures into molds or dies and allowed to "gel," or cure. See, e.g. U.S. Pat. No. 5,538,786 to Hurley et al., issued Jul. 23, 1996, entitled "Process for the preparation of filled urethane-based reinforced molding and the resultant products," and U.S. Pat. No. 5,468,432 also to Hurley et al., issued Nov. 21, 1995, entitled "Process for the preparation of filled urethane-based reinforced moldings."

Reaction injection molding, although widely used, is a time-consuming and expensive process. RIM processes require expensive equipment having a large footprint. Molds must be made of heavy metal and be able to withstand the high pressures and the high temperatures utilized in the RIM process. In addition to the molds and injection apparatus, the RIM process requires large, heavy presses which are used to stabilize the molds when they are under high pressure. The necessary use of high temperatures and high pressures makes the molding process time-intensive; the time required to heat up and pressurize, then cool down and depressurize, the molds is, in most cases, longer than the time required to actually inject and first cure the article. Further, if a hollow article is desired, it must be molded in two pieces, which are subsequently affixed to one another. Thus, production time of hollow polyurethane articles is almost twice that of solid articles. Because of the costs of equipment, the energy costs of heating and pressurizing the mold and the time required to run the molding process and assemble the article, total production costs for a hollow reaction injection molded article are relatively high.

Another type of molding process, also well known in the art, is rotational molding, commonly referred to as "roto-molding." Rotomolding is useful for molding hollow articles, but, as currently practiced in the art, is suitable only for molding non-polyurethane thermoplastics. Common rotomolded articles include toys, sporting goods and containers. See, e.g. U.S. Pat. No. 4,970,045 to Steinberg et al., issued Nov. 13, 1990, entitled "Rotational molding of articles having impact resistance," and U.S. Pat. No. 5,830,392 to Strebel, "Compositions and process for rotational molding articles," issued Nov. 3, 1998. The basic rotomolding process consists of: (1) placing the thermoplastic resin, in solid or liquid form, into a closed mold, (2) heating the mold until the resin melts or acquires proper flow characteristics, (3) simultaneously rotating the mold about two perpendicular axes, i.e., biaxially, until the resin uniformly coats the interior surfaces of the mold, (4) cooling the mold, and (5) removing the article from the mold. A general discussion of rotomolding techniques is provided in *Modern Plastics Encyclopedia,* 1979–1980, vol. 56, No. 10A at page 381, the contents of which are incorporated herein by reference, and in *Plastics Mold Engineering Handbook,* 4th ed., VA Nostrand Reinhold Co., 1987, also incorporated herein by reference.

The production costs of conventional rotomolding using thermoplastics are somewhat less than those of RIM. However, because thermoplastic rotomolding requires the use of high temperatures, the process requires metal molds. The energy costs of heating the molds, the inconvenience of handling heavy, unwieldy metal molds, and the length first cure time all make the rotational molding of non-polyurethane thermoplastics, a less-than-ideal process from a commercial perspective.

Polyurethanes of the type suitable for molding, i.e., high-modulus elastomers, are well known in the art. Synthesis of such polyurethanes is carried out by the reaction of compounds containing isocyanate groups (either monomers, oligomers, or prepolymers) with hydroxy-containing compounds, or "polyols" (either monomers, oligomers, or prepolymers). The functionality of the isocyanate compounds and the hydroxy-containing compounds must be greater than or equal to two.

The precise compounds suitable for use in the preparation of polyurethanes are numerous, and will vary, depending on the characteristics desired in the finished molded article. Suitable hydroxy-containing compounds include polyesters, polyethers, polythioethers, polyacetals and polycarbonates. Suitable compounds containing isocyanate groups include the aliphatic, cycloaliphatic, aromatic and heterocyclic polyisocyanates. Isocyanate-containing compounds are known, and are disclosed with further specificity in the art, see e.g., Allen, G. and J. Bevington, eds., *Comprehensive Polymer Science: The Synthesis, Characterization, Reactions and Applications of Polymers,* vol. 5, 1989, at pages 413 to 426, the contents of which are incorporated herein by reference.

As is well known in the art, the curing reaction for high-modulus elastomer polyurethane for use in molding or forming processes can be carried out using the "one-shot" approach. All ingredients (isocyanates, polyols with short-chain diol or amino chain extender and/or polyamines) are mixed simultaneously (in "one shot"), together with any other desired additives, such as fillers, catalysts, colorants, or plasticizers. The mixture is placed in a mold or other form and allowed to remain there until at least the first cure has been completed. First curing can be accomplished thermally, or, if the mixture contains high levels of mixed catalysts or appropriately fast-reacting isocyanates and active hydrogen-containing materials, curing can take place at room temperature. Such systems usually consist of two components: an "A" component, sometimes referred to as the "resin," consisting of the polyol(s), catalysts, or polyamine(s), with a chain extender, as well as any of the desired additives, and a "B" component, sometimes referred to as the "hardener," containing di- or polyisocyanates. Further discussion of the "one shot approach" to polyurethane preparation and compounds useful therein can be found in Allen, G. and J. Bevington, eds., *Comprehensive Polymer Science: The Synthesis, Characterization, Reactions and Applications of Polymers,* vol. 5, 1989, at pages 413 to 426, the contents of which are incorporated herein by reference.

The inclusion of additives and/or process materials is well known as a means of modifying the finished properties of polyurethane materials. Additives are commonly used to increase the hardness of the material or augment its resistance to external stresses, such as ultraviolet light or bacteria. See, e.g. U.S. Pat. No. 5,053,274 to Jonas, "Highly filled substantially solid polyurethane, urea and isocyanurate composites for indoor and outdoor applications, for load bearing structural and decorative products," issued Oct. 1, 1991. Such additives may include glass fibers, ceramic microspheres, sodium bicarbonate or calcium bicarbonate. Colorants are also frequently added to aesthetically enhance the molded article. See, e.g. U.S. Pat. No. 4,132,840 to Hugl et al., "Process for coloring polyurethane foams," issued Jan. 2, 1979.

It would be highly desirable to develop a process of manufacture of hollow unitary polyurethane articles which would be more cost-effective and less time-intensive than conventional RIM methods of molding polyurethane, and which could be performed in the absence of high temperature and high pressure. These objectives are achieved by the process of the present invention whereby it is possible to rotationally mold hollow, unitary objects of polyurethane without using heavy metal molds, high temperatures, high pressures and which has the additional advantage of a relatively short first cure time.

SUMMARY OF THE INVENTION

The present invention relates to a process for the manufacture of hollow polyurethane articles formed by rotational molding, and to the polyurethane articles which result upon completion of the curing step of the rotational molding process. Of primary importance to the inventive development is the discovery that articles can be rotationally-molded from polyurethane composite if the unpolymerized matter containing the appropriate reactants, or the "polyurethane composite precursor," contains a filler of an amount which alters the precursor's flow characteristics thereby making it suitable for rotational molding, i.e., making it of a viscosity and specific gravity such that, when subjected to centrifugal force, it uniformly coats the interior of the mold. In the absence of the appropriate amount of filler, the precursor will pool or puddle, and sections of the walls of the mold will remain uncoated.

In one aspect, this invention provides a process of molding a hollow polyurethane article which comprises:

(a) obtaining a mixture comprising a hardener, a resin and a filler, wherein the hardener comprises one or more organic di- or polyisocyanates, and the resin comprises of one or more compounds containing at least two isocyanate-reactive groups, the filler is about 15% to about 50% by weight, or alternatively, about 15% to about 35% by weight, or, in a preferred embodiment, about 25% by weight, the % weight being based upon total weight of the mixture, and either the hardener or the filler optionally contains additives and/or catalysts;

(b) placing the mixture in the cavity of a rotational mold;

(c) rotating the mold until the first cure is completed; and (d) removing the polyurethane article from the mold.

The mold can be rotated simultaneously around one, two, three or more axes, depending on the shape and dimensions of the particular mold used. In a preferred embodiment, the mold is rotated simultaneously around two, perpendicular axes.

The filler component of the mixture can consist of a filler having a specific gravity of about 0.5 to about 3.0, or, alternatively, of less than or equal to about 1.2. It can consist of one or more of the following: sodium bicarbonate, calcium bicarbonate, milled glass fiber, ceramic microspheres or a mixture thereof. Alternatively, the process of the present invention can be performed using a mixture wherein the filler is solely hollow ceramic microspheres. The process can also be performed using a mixture in which property-modifying additives have been included, resulting in an end product with properties or characteristics different from those of 'pure' polyurethane. Useful additives include plasticizers, ultraviolet absorbers, antioxidants, friction modifiers, abrasion enhancers, fungicides and colorants.

Another aspect of the invention pertains to the rotationally molded polyurethane articles which result upon completion of the curing step of the above-described process. The resulting articles comprise a composite having a solid matrix consisting of a polyurethane and a filler, wherein the filler is present at about 15% to about 50% by weight, or, at about 15% to 35% by weight, the percent weight being based upon the total weight of the article. In a preferred embodiment, the filler is present in an amount of about 25% by weight.

The article can be molded by simultaneously rotating the mold around one, two, three or more axes. The filler component of the mixture used to mold the article can consist of a filler having a specific gravity of about 0.5 to about 3.0, or, alternatively, of less than or equal to about 1.2. The filler can be any one filler selected from the group comprising of sodium bicarbonate, calcium bicarbonate, milled glass fibers or a mixture thereof. In a particular aspect of the invention, the filler is ceramic microspheres. The composite may also include any number of property enhancing or altering additives including plasticizers, ultraviolet absorbers, antioxidants, friction modifiers, abrasion enhancers, fungicides and colorants.

In a final aspect, the invention provides for a process by which articles of polyurethane composites can be rotationally molded using a non-thermoplastic polyurethane precursor composite, wherein said precursor contains a filler or fillers in an amount sufficient to allow the precursor to uniformly coat the walls of a mold when the mold is rotated. The filler component of the precursor used to mold the article can comprise a filler having a specific gravity of about 0.5 to about 3.0, or, alternatively, of less than or equal to about 1.2.

In addition, the invention provides for a process by which articles of polyurethane composites can be rotationally molded using a non-thermoplastic polyurethane precursor composite, wherein said precursor contains a filler or fillers present in an amount of about 15% to about 50% by weight, or, at about 15% to 35% by weight, the percent weight being based upon the total weight of the article. In a preferred embodiment, the filler is present in an amount of about 25% by weight.

DETAILED DESCRIPTION OF THE PREFERRED EMBODIMENTS OF THE INVENTION

The present invention relates to a process for producing rotationally-molded polyurethane articles and the rotationally-molded polyurethane articles which are the products of the molding process.

The process of the present invention whereby articles are rotationally molded comprises the general steps of: (a) obtaining a mixture consisting of a hardener, a resin and a filler, (b) placing the mixture in the cavity of a rotational mold, (c) rotating the mold, until the first cure is completed, and (d) removing the cured article from the mold.

The hardener required by step (a) of the process is made up of one or more organic di- or polyisocyanates. Polyisocyanates useful in the preparation of polyurethanes are well known in the art and include the aliphatic, the cycloaliphatic, the aromatic, the heterocylic polyisocyantes, and similar compounds. Particularly preferred are the liquid forms of 4,4'-diphenylmethane diisocyanate (MDI).

The resin of step (a) may comprise one or more compounds containing at least two functional groups capable of reacting with isocyanate groups. Such compounds may include any of the high molecular weight compounds (400 MW to 10,000 MW) or the low molecular weight compounds, "chain extenders" (62 MW to 399 MW), known in the art for use in preparing polyurethane. High molecular weight compounds include, but are not limited to, polyesters, polyethers, polythioethers, polyacetals, and polycarbonates containing at least two isocyantae-reactive functional groups of the type known in the art for the production of polyurethanes. Such compounds are well known in the art and can be found in, e.g., U.S. Pat. No. 5,468,432 to Hurley et al., "Process for the preparation of filled urethane-based reinforced moldings," issued Nov. 21, 1995, the contents of which are incorporated herein by reference; U.S. Pat. No. 4,843,105 to Reischl et al., "Process for the preparation of filler-containing, antionically modified polyurethane (urea) compositions, the polyurethane (urea) compositions so-obtained and the use thereof," issued Jun. 27, 1987, the contents of which are incorporated herein by reference; Allen, G. and J. Bevington, eds., *Comprehensive Polymer Science: The Synthesis, Characterization, Reactions and Applications of Polymers*, vol. 5, 1989, at pages 413 to 426, the contents of which are incorporated herein by reference.

It is preferred that the filler component of step (a) is present in the mixture in an amount equal to about 15% to about 50% by weight, or about 15% to about 35% by weight, of the final article or composite. In a most preferred embodiment, the filler is present in the amount of 25% by weight of the article or composite. Filler materials for use in molded polyurethane are well known in the art. Fillers useful in the present invention are generally lightweight, having a specific gravity in the range of about 0.5 to about 3.0, or, in the more preferred range of less than or equal to about 1.2. Suitable fillers include milled glass fibers, hollow or solid ceramic microspheres, sodium bicarbonate, calcium bicarbonate, or any combination thereof. Particularly preferred are hollow ceramic microspheres ranging in size from 10 to 300 microns with a specific gravity of 0.67. Such microspheres are readily commercially available, for example, under the trademark "RECYCLOSPHERES™" by Sphere Services, Inc. of Oak Ridge, Tenn.

If desired, catalysts may be added to the reaction to facilitate rapid curing at room temperatures. Such catalyst may be chosen from the many known in the art as useful in the preparation of polyurethanes. Particularly preferred are dibutyltin dilaurate, triethylene diamine, dipropylene glycol, or mixtures thereof.

When practicing the process of the present invention, the desired hardener(s), resin(s), filler(s), and optional catalyst (s) are prepared as is known in the art. As is usual in the art, it is preferable to mix the filler and the resin component together prior to the addition of the hardener. Further, depending on the type of polyurethane desired, foamed or unfoamed, and the particular circumstances under which the article is being produced, the filler-resin mixture, or the resin alone, may be treated with a compound specifically known in the art to "scavenge," and therefore, remove, isocyante-reacting water molecules. Such compounds include all those well-known in the art, especially those belonging to the class known as molecular sieve zeolites.

Once the components of the mixture of process step (a) are prepared, they are mixed, and placed in the cavity of a rotational mold. The mold itself can be made of any suitable material as known in the art, including, but not limited to, fiberglass, wood, metal, lexan or stock plastic. It is helpful if the mold has been pretreated with a mold release agent, as is known in the art.

The mold is rotated in any manner known in the art. It can be rotated about one or multiple axes. In a preferred embodiment, the mold is then rotated biaxially, i.e., rotated simultaneously around two perpendicular axes as is well known in the rotational molding art. The ratio of the number of rotations around each axis will vary depending on the particular article being molded; however, unless the molded object is perfectly spherical, it is generally preferred that the ratio not equal 1:1, an that the second rate is not a multiple of the first. The appropriate ratio of the rotations is determined through a process of trial and error well known in the art, whereby the ratio of the longest dimension to the shortest dimension of the article to be molded is used as a starting point. The final ratio should be that at which the polyurethane composite precursor becomes uniformly distributed along the surfaces of the rotational mold.

The rate of rotation will also vary, depending on the size and shape of the object. However, the rates will generally be in the range of about 0.2 revolutions per minute (RPM) to about 25 RPM.

The mold containing the polyurethane mixture is rotated biaxially at the selected RPMs until the mixture has sufficiently polymerized to retain the mold's shape, commonly referred to as completing the "first cure." Methods of determining the first cure time are well known in the art and will vary widely depending on the size of the article being molded and the particular compounds and catalysts from which the polyurethane composite precursor was originally prepared. In general, first cure times range from about 30 seconds to about 2 hours. After completion of first cure, the article is removed from the mold and undergoes demolding, as is commonly known in the art.

The wall thickness of the resulting article is usually about 0.15 inches at its thinnest point. If walls of a greater thickness are desired, the molding process can be repeated, as many times as desired, until the desired wall thickness is obtained through the build up of the deposited layers. Further, depending on the additives included in the compositions used in the subsequent moldings, an article having layers of different colors or an article having polyurethane layers with differing properties may be created.

The following non-limiting Example serves to further illustrate the process of the present invention.

EXAMPLE

The particular process disclosed by this example was carried out using the 'one-shot' technique of rotational molding. As such, it required the mixture of an "A," or resin, component with a "B," or hardener, component.

I. Preparing the Polymerization Reaction

A resin, or "A" component suitable for rotational molding was prepared in accordance with the invention by mixing the following in a five-gallon pail:

1. 11 pounds of hollow ceramic microspheres
2. 6 pounds of BAYTEC® ENC 120P
3. 12 pounds of BAYTEC® ENC 140P
4. 8 ounces of Baylith® paste
5. 8.5 milliliters of RC Catalyst 105
6. 2.5 milliliters of RC Catalyst 201

Ingredient 1 was hollow ceramic microspheres having a size range from 10 to 30 microns with a mean particle size of 127 microns, and a specific gravity of 0.67. The were obtained from Sphere Services, Inc. of Oak Ridge, Tenn. and are sold under the trademark "RECYCLOSPHESRES™." Ingredient 2 was an epoxy-modified polypropylene oxide-based triol having a hydroxyl number of 30 to 33 mg KOH/g. It is sold as BAYTEC® ENC 12OP. Ingredient 3 is an epoxy-modified polypropylene oxide-based triol with a hydroxyl number of 210 to 234 mg KOH/g. It is sold as BAYTEC® ENC 140P. Both ingredients, 2 and 3, were obtained from the Polymers Division of Bayer Corporation, in Pittsburgh, Pa.

Ingredient 4 was a molecular sieve zeolite having the structure of zeolite type A, and the following chemical structure:

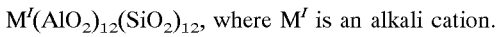
$M^I(AlO_2)_{12}(SiO_2)_{12}$, where $M^I$ is an alkali cation.

It was obtained from the Bayer Corporation, where it is sold under the trade name "BAYLITH®." Ingredient 5 was a catalyst consisting of triethylene diamine and dipropylene glycol, available from Rhein Chemie of Trenton, N.J. Ingredient 6 was dibutylin dilaurate, also a catalyst, and also available from Rhein Chemie of Trenton, N.J.

A hardener, or "B," component suitable for rotational molding was prepared in accordance with the invention by mixing the following:

7. 9.5 pounds of MONDUR MR
8. 9.5 pounds of MONDUR MR Light

Ingredient 7 was polymeric 4-4'-diphenylmethane diisocyanate, in liquid form, having an NCO content of 31.5%, by weight. Ingredient 8 was polymeric 4-4'-diphenylmethane diisocyanate, in liquid form, having an NCO content of 31.9% by weight.

To prepare the resin component, ingredients 1, 2, 3 and 4 were first combined and allowed to remain at room temperature for about seven hours. Ingredients 5 and 6 (the catalysts) were added just prior to molding. The resin mixture was heated to 105° F.

The hardener was prepared by mixing ingredients 7 and 8 just prior to molding. The hardener remained at room temperature.

To combine the resin and the hardener, a two-metered pump system is used. The resin was placed in one holding reservoir of the metered pump and the hardener in another. The resin in the reservoir was continuously recirculated to prevent the filler from settling, and to maintain the resin temperature.

The metered pump was set to pump resin and hardener at a ratio of 67 parts resin to 33 part hardener. The pump released resin and hardener from the reservoirs at the proper ratio into a mixing head, where it was blended by a rotating mixer blade. About four liters of the resin/hardener mixture was then placed in a bucket for transport to the rotational mold.

As soon as the hardener and resin are mixed, the polymerization reaction begins. In general, when practicing this example, the resin/hardener mixture will remain in liquid form for about two minutes. After three minutes it becomes paste-like, and thus no longer useful for rotational molding processes.

II. Molding

The mold used was a fiberglass mold of a non-uniform shape with one opening measuring two inches in diameter, and having dimensions of approximately 14 inches by 18 inches. Specifically, the mold used produces subwoofer housings for use in Chevrolet Cameros or Firebirds made in the years 1993 to 1999. The mold was mounted on a conventional rotational molding machine, with the opening oriented in an upwards direction. The mold was treated with a silicone release product, L-506 silicone oil, available from Dwight Products, Inc. of Lyndhurst, N.J. The mixture in the bucket was poured through a PVC pipe placed in the mold opening. The pipe remains in the opening throughout the rotating process.

The mold was rotated around two, perpendicular axes, axis 1 and axis 2. Axis 1 bisected the mold along its longest dimension. Axis 2 was perpendicular to axis 1. The rate of rotation about axis 1 was about 19 RPM; the rate of rotation about axis 2 was about 12 RPM. After rotating in one direction for about 25 seconds, the direction of the rotations was changed, and the rotations were carried out for about another 25 seconds in the opposite direction. Rotations in alternating directions were continued for about 6 minutes. After six minutes, the polyurethane material had gelled, or completed its first cure, and the rotations were stopped.

The mold was opened, and the article was removed. The empty mold was wiped with a silicone release product, L-506 silicone oil, available from Dwight Products, Inc. of Lyndhurst, N.J., and the process was repeated.

It will be apparent to those skilled in the art that the novel principles of the invention disclosed herein in connection with the specific embodiments and Example thereof will suggest various other modifications and applications of the same. Thus, it is accordingly desired that, in construing the breadth of the following claims, they shall not be limited to the examples described in the specification but shall be construed to encompass all modifications and alterations which do not depart from the spirit of the invention.

I claim:

1. A process for rotationally molding a hollow polyurethane article within a mold cavity of a rotational mold comprising:
   a) obtaining a resin comprising at least one compound with at least two isocyanate-reactive groups;
   b) mixing the resin with a filler, which is of a type and an amount sufficient to alter the flow characteristic of a mixture comprising the resin, the filler and a hardener such that, upon rotation of a rotational mold, the mixture will uniformly coat the interior of the mold cavity without pools, puddles or uncoated sections of any wall of the mold cavity;
   c) heating the combined resin and filler sufficient to improve its ability to flow;
   d) adding the hardener, which comprises at least one di- or polyisocyanate, to the resin and filler to form the mixture;
   e) placing the mixture in the mold cavity of the rotational mold, which is at about ambient temperature;
   f) rotating the rotational mold about at least one axis of the rotational mold, until the mixture is sufficiently gelled to allow the molded hollow polyurethane article to be removed from the rotational mold; and
   g) removing the molded hollow polyurethane article from the rotational mold.

2. A process according to claim 1 further comprising the step of allowing the mixed resin and filler to stand at room temperature prior to heating.

3. A process according to claim 1 further comprising the step of adding a catalyst to the mixed resin and filler.

4. A process according to claim 1 further comprising the step of adding a molecular sieve zeolite to the mixed resin and filler.

5. A process according to claim 1 wherein the filler is selected from the group consisting of milled glass fibers, hollow ceramic microspheres, solid ceramic microspheres, sodium bicarbonate, calcium bicarbonate, and any combination thereof.

6. A process according to claim 1 wherein the filler comprises hollow ceramic microspheres.

7. A process according to claim 1 wherein the filler is mixed with the resin in the amount of about 15% to about 35% by weight.

8. A process according to claim 1 wherein the filler is mixed with the resin in the amount of about 25% by weight.

9. A process according to claim 1 wherein the filler has a specific gravity of about 0.5 to about 3.0.

10. A process according to claim 1 wherein the filler has a specific gravity of less than or equal to about 1.2.

11. A process according to claim 1 wherein the mixture further comprises one or more additives selected from the group consisting of plasticizers, catalysts, ultra-violet absorbers, antioxidants, friction modifiers, abrasion enhancers, fungicides and colorants.

12. A process according to claim 1 wherein the mixture is substantially non-foaming.

13. A process for rotationally molding a hollow polyurethane article within a mold cavity of a rotational mold comprising:

a) obtaining a resin comprising at least one compound with at least two isocyanate-reactive groups;

b) mixing the resin with a filler, which is of a type and an amount sufficient to alter the flow characteristic of a mixture comprising the resin, the filler and a hardener such that, upon rotation of a rotational mold, the mixture will uniformly coat the interior of the mold cavity without pools, puddles or uncoated sections of any wall of the mold cavity;

c) heating the combined resin and filler sufficient to improve its ability to flow;

d) adding the hardener, which comprises at least one di- or polyisocyanate, to the resin and filler to form the mixture;

e) placing the mixture in the mold cavity of the rotational mold, which is at less than 105° F.;

f) rotating the rotational mold about at least one axis of the rotational mold, until the mixture is sufficiently gelled to allow the molded hollow polyurethane article to be removed from the rotational mold; and g) removing the molded hollow polyurethane article from the rotational mold.

* * * * *